(12) United States Patent
Kurihara et al.

(10) Patent No.: US 10,764,711 B2
(45) Date of Patent: Sep. 1, 2020

(54) CONTENT DISTRIBUTION SERVER AND CONTENT DISTRIBUTION METHOD

(71) Applicant: HONDA MOTOR CO., LTD., Tokyo (JP)

(72) Inventors: Tadashi Kurihara, Tokyo (JP); Yoshiaki Sugimoto, Tokyo (JP); Minoru Fukumori, Tokyo (JP); Shunsuke Kawasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/615,492

(22) PCT Filed: May 9, 2018

(86) PCT No.: PCT/JP2018/017905
§ 371 (c)(1),
(2) Date: Nov. 21, 2019

(87) PCT Pub. No.: WO2018/221139
PCT Pub. Date: Dec. 6, 2018

(65) Prior Publication Data
US 2020/0092673 A1    Mar. 19, 2020

(30) Foreign Application Priority Data

May 29, 2017 (JP) .................................. 2017-105503

(51) Int. Cl.
*H04W 4/021* (2018.01)
*H04W 4/024* (2018.01)
(Continued)

(52) U.S. Cl.
CPC ........ *H04W 4/021* (2013.01); *G06F 16/2455* (2019.01); *G07C 5/008* (2013.01); *H04W 4/024* (2018.02); *H04W 4/48* (2018.02)

(58) Field of Classification Search
CPC ..................................................... H04W 4/021
(Continued)

(56) References Cited

U.S. PATENT DOCUMENTS

2007/0219706 A1   9/2007   Sheynblat
2012/0323402 A1  12/2012   Murakami
2017/0122764 A1   5/2017   Nakahara et al.

FOREIGN PATENT DOCUMENTS

CN     106104208 A      11/2016
JP     2013-002958       1/2013
(Continued)

OTHER PUBLICATIONS

International Search Report, dated Jul. 31, 2018, 1 page.
(Continued)

*Primary Examiner* — Joel Ajayi
(74) *Attorney, Agent, or Firm* — Rankin, Hill & Clark LLP

(57) ABSTRACT

A content distribution server is provided with: a storage unit, which stores a plurality of pieces of content related to a facility; an acquisition unit, which acquires, from an in-vehicle navigation device of the vehicle, any one or both of starting information on a vehicle and location information on the vehicle, as information for determination; and a content distribution unit, which distributes content stored in the storage unit to a mobile terminal. The content distribution unit determines, on the basis of the information for determination acquired by the acquisition unit, whether a user can visit the facility by the vehicle, and determines, on the basis of the determination result, which content in the plurality of pieces of content stored in the storage unit is distributed to the mobile terminal.

9 Claims, 10 Drawing Sheets

(51) Int. Cl.
   *H04W 4/48* (2018.01)
   *G06F 16/2455* (2019.01)
   *G07C 5/00* (2006.01)

(58) Field of Classification Search
   USPC ...................................................... 455/456.2
   See application file for complete search history.

(56) References Cited

FOREIGN PATENT DOCUMENTS

| | | |
|---|---|---|
| JP | 2013-050454 | 3/2013 |
| JP | 2016-151512 | 8/2016 |
| JP | 2017-083315 | 5/2017 |

OTHER PUBLICATIONS

Notice of Reasons for Rejection issued to JP Application No. 2017-105503, dated Jul. 31, 2018, 2 pages.
Notice of Decision to Grant a Patent to JP Application No. 2017-105503, dated Feb. 19, 2019, 1 page.
Chinese Office Action dated Apr. 2, 2020, 9 pages.

FIG. 5

CUSTOMER MANAGEMENT DATABASE

| CUSTOMER ID | VEHICLE ID | MOBILE TERMINAL ID |
|---|---|---|
| AAA | ... | ... |
| BBB | ... | ... |
|  |  | ... |
| CCC | ... | ... |
| ⋮ | ⋮ | ⋮ |
|  |  |  |
| ZZZ | ... | ... |

CONTENT DISTRIBUTION SERVER AND CONTENT DISTRIBUTION METHOD

TECHNICAL FIELD

The present invention relates to a content distribution server and a content distribution method that distribute contents.

BACKGROUND ART

In the related art, a content distribution server is known in which contents are distributed in response to a request from a mobile terminal. By using the content distribution server, it is possible to provide, for example, store information, a coupon, or the like, with respect to a user using the mobile terminal, as the content.

An example of a technology relevant to such a content distribution server is disclosed in Patent Document 1. In the technology disclosed in Patent Document 1, a navigation application for route guidance is built in the mobile terminal. Then, various service information items are distributed with respect to the navigation application, from the content distribution server. In addition, in the technology disclosed in Patent Document 1, a movement rate of the user is detected on the basis of position information that is positioned by a global positioning system (GPS). Then, it is determined whether the user moves by foot or by a vehicle or a bicycle, from the detected movement rate. Further, contents corresponding to a determination result are distributed from the content distribution server.

Patent Document 1: Japanese Unexamined Patent Application, Publication No. 2016-151512

DISCLOSURE OF THE INVENTION

Problems to be Solved by the Invention

In the case of using the technology disclosed in Patent Document 1 or the like, as described above, it is possible to distribute the content according to a movement means. However, in the technology disclosed in Patent Document 1, it is determined what the movement means is simply based only on the movement rate of the mobile terminal, and there is also a case where accurate determination is not capable of being performed. For example, in a case where the user moves by a public bus, it is not possible to accurately determine whether the user moves by a public bus of which a movement route is limited or by a vehicle that can be moved on an arbitrary route, by only observing the movement rate. In addition, even in a case where the user moves by the vehicle, when the user is not capable of smoothly moving due to traffic snarl-up or the like, it is not possible to accurately determine whether the user moves by the vehicle or by the bicycle, by only observing the movement rate.

For this reason, a case is also considered in which contents not corresponding to an actual movement means are provided due to an incorrect determination result. For example, the content of a facility in a position to which the user is not capable of visiting by a movement route of the bus is provided with respect to a user who moves by a bus movement, or the content of a facility in a distance to which the user is not capable of visiting by the bicycle is provided with respect to a user who moves by a bicycle.

The present invention has been made in consideration of such circumstances, and an object of the present invention is to provide a content distribution server and a content distribution method that are capable of distributing contents according to a movement means, after more accurately determining the movement means.

Means for Solving the Problems (1) A content distribution server (for example, a content distribution server 30 described below) according to a first viewpoint of the present invention, includes: a storage unit (for example, a storage unit 32 described below) that stores a plurality of contents associated with a facility; an acquisition unit (for example, an information for determination acquisition unit 311 described below) that acquires any one or both of activation information of a vehicle (for example, a vehicle 60 described below) and position information of the vehicle from an in-vehicle device (for example, an in-vehicle navigation device 10 described below) of the vehicle, as information for determination; and a content distribution unit (for example, a content distribution unit 312 described below) that distributes the contents stored in the storage unit with respect to a mobile terminal (for example, a mobile terminal 20 described below), in which the content distribution unit determines whether or not a user is capable of visiting to the facility by the vehicle, on the basis of the information for determination that is acquired by the acquisition unit, and determines which content in the plurality of contents stored in the storage unit is distributed with respect to the mobile terminal, on the basis of a determination result.

According to (1) described above, an effect is obtained in which it is possible to distribute contents according to a movement means, after more accurately determining the movement means on the basis of the information for determination that is acquired from the in-vehicle navigation device provided in the vehicle.

(2) In the content distribution server according to (1) described above, in a case where a distribution request of the content is received from the mobile terminal, the acquisition unit may further request the information for determination of the vehicle with respect to an in-vehicle device of a vehicle corresponding to a mobile terminal of a distribution request source of the content, and acquire the information for determination of the vehicle from the in-vehicle device, as a response of the request.

According to (2) described above, an effect is obtained in which the information for determination is inquired when content distribution is requested, and thus, it is possible to acquire the newest information for distribution according to a current situation, and to perform the determination.

(3) In the content distribution server according to (1) described above, the content distribution server may further include: an accumulation unit (for example, an information for determination accumulation unit 313 described below) that receives the information for determination of the vehicle from the in-vehicle device of the vehicle, and accumulates the information for determination, triggered by activation of the vehicle, and in a case where a distribution request of the content is received from the mobile terminal, the acquisition unit may further acquire information for determination of a vehicle corresponding to a mobile terminal of a distribution request source of the content, from the accumulation unit.

According to (3) described above, an effect is obtained in which in a case where the distribution request of the content is received, it is possible to acquire the information for determination on the server side, and to perform the determination, without performing inquiry with respect to the vehicle.

(4) In the content distribution server according to (2) or (3) described above, the content distribution server may further include: a customer management database (for example, a customer management database 321 described below) in which identification information of the mobile terminal and identification information of the vehicle are associated with each other, for each user, and the acquisition unit may further acquire the identification information of the mobile terminal from the mobile terminal of the distribution request source of the content, and specify the vehicle corresponding to the mobile terminal of the distribution request source of the content, with reference to the acquired identification information of the mobile terminal, and the database.

According to (4) described above, an effect is obtained in which it is possible to specify the vehicle corresponding to the mobile terminal of the distribution request source of the content, and to perform the determination, by using the association between the identification information of the mobile terminal and the identification information of the vehicle.

(5) In the content distribution server according to (2) or (3) described above, the acquisition unit may further acquire position information of the mobile terminal from the mobile terminal of the distribution request source of the content, and in a case where a position of the mobile terminal that is specified by the position information of the mobile terminal is in a predetermined range from a position of the vehicle that is specified by the information for determination, specify the vehicle as the vehicle corresponding to the mobile terminal of the distribution request source of the content.

According to (5) described above, an effect is obtained in which even in a case where the database or the like is not prepared in advance, it is possible to specify the vehicle corresponding to the mobile terminal of the distribution request source of the content on the basis of the coincidence of the position information items, and to perform the determination.

(6) A content distribution server according to a second viewpoint of the present invention, includes: a storage unit (for example, the storage unit 32 described below) that stores a plurality of contents associated with a facility; an acquisition unit (for example, the information for determination acquisition unit 311 described below) that acquires linkage information indicating whether or not a mobile terminal (for example, the mobile terminal 20 described below) and an in-vehicle device (for example, the in-vehicle navigation device 10 described below) of a vehicle (for example, the vehicle 60 described below) are in a state of being linked, from the mobile terminal, as information for determination; and a content distribution unit (for example, the content distribution unit 312 described below) that distributes the contents stored in the storage unit with respect to the mobile terminal, in which the content distribution unit determines whether or not a user is capable of visiting to the facility by the vehicle, on the basis of the information for determination that is acquired by the acquisition unit, and determines which content in the plurality of contents stored in the storage unit is distributed with respect to the mobile terminal, on the basis of a determination result.

According to (6) described above, an effect is obtained in which it is possible to distribute the contents according to a movement means, after more accurately determining the movement means on the basis of the information for determination that is acquired from the mobile terminal.

(7) In the content distribution server according to (6) described above, the linkage information may be information indicating whether or not near field communication is performed between the mobile terminal and the in-vehicle device. According to (7) described above, an effect is obtained in which it is possible to perform the determination on the basis of the information for determination indicating a getting-in state in which the near field communication is performed.

(8) In the content distribution server according to any one of (1) to (7) described above, in a case where it is determined that the user is capable of visiting to the facility by the vehicle, the content distribution unit may further distribute a content that is stored in the storage unit and is associated with a facility provided with a parking lot, with respect to the mobile terminal.

According to (8) described above, an effect is obtained in which it is possible to distribute the contents associated with the facility that is highly convenient when the user is capable of moving by the vehicle, and is provided with the parking lot for parking vehicles, as the content according to the movement means.

(9) In the content distribution server according to any one of (1) to (8) described above, in a case where a destination in route guidance is set in the in-vehicle device of the vehicle, the acquisition unit may further acquire any one or both of information indicating the destination and information indicating a route to the destination, from the in-vehicle device, and the content distribution unit may distribute a content that is stored in the storage unit and corresponds to any one or both of the information indicating the destination and the information indicating the route to the destination, with respect to the mobile terminal.

According to (9) described above, an effect is obtained in which it is possible to distribute the content according to the movement means, in consideration of the destination that is set.

(10) A content distribution method according to the first viewpoint of the present invention, includes: a storing step of storing a plurality of contents associated with a facility; an acquiring step of acquiring any one or both of activation information of a vehicle (for example, the vehicle 60 described below) and position information of the vehicle from an in-vehicle device (for example, the in-vehicle navigation device 10 described below) of the vehicle, as information for determination; and a content distributing step of distributing the contents stored in the storing step with respect to a mobile terminal (for example, the mobile terminal 20 described below), in which in the content distributing step, it is determined whether or not a user is capable of visiting to the facility by the vehicle, on the basis of the information for determination that is acquired in the acquiring step, and it is determined which content in the plurality of contents stored in the storing step is distributed with respect to the mobile terminal, on the basis of a determination result.

According to the method of (10) described above, the same effect as that of the content distribution server according to (1) described above is obtained.

(11) A content distribution method according to the second viewpoint of the present invention, includes: a storing step of storing a plurality of contents associated with a facility; an acquiring step of acquiring linkage information indicating whether or not a mobile terminal (for example, the mobile terminal 20 described below) and an in-vehicle device (for example, the in-vehicle navigation device 10 described below) of a vehicle (for example, the vehicle 60 described below) are in a state of being linked, from the mobile terminal, as information for determination; and a content distributing step of distributing the contents stored in the storing step with respect to the mobile terminal, in which in the content distributing step, it is determined whether or not a user is capable of visiting to the facility by the vehicle, on the basis of the information for determination that is acquired in the acquiring step, and it is determined which content in the plurality of contents stored in the storing step is distributed with respect to the mobile terminal, on the basis of a determination result.

According to the method of (11) described above, the same effect as that of the content distribution server according to (6) described above is obtained.

Effects of the Invention

According to the present invention, it is possible to distribute contents according to a movement means, after more accurately determining the movement means.

BRIEF DESCRIPTION OF THE DRAWINGS

FIG. 5 is a diagram illustrating an example of a customer management database in each of the embodiments of the present invention.

PREFERRED MODE FOR CARRYING OUT THE INVENTION

Hereinafter, embodiments of the present invention will be described in detail with reference to the drawings. Furthermore, hereinafter, three embodiments will be described. As the outline of three embodiments, a first embodiment is an embodiment in which an in-vehicle navigation device is inquired about which content is distributed to a mobile terminal by a content distribution server, and determination is performed on the basis of the transmitted information, as a reply of the inquiry. In addition, a second embodiment is an embodiment in which an in-vehicle navigation device determines which content is distributed to a mobile terminal by a content distribution server, on the basis of information that is started to be transmitted in accordance with activation. Further, a third embodiment is an embodiment in which it is determined which content is distributed to a mobile terminal by a content distribution server, on the basis of information that is transmitted from the mobile terminal. Hereinafter, first, the entire configuration of a content distribution system 1 that is common to three embodiments will be described, and then, the detailed configuration of each of the embodiments will be individually described.

<Entire Configuration of Content Distribution System 1>

Figure 1:
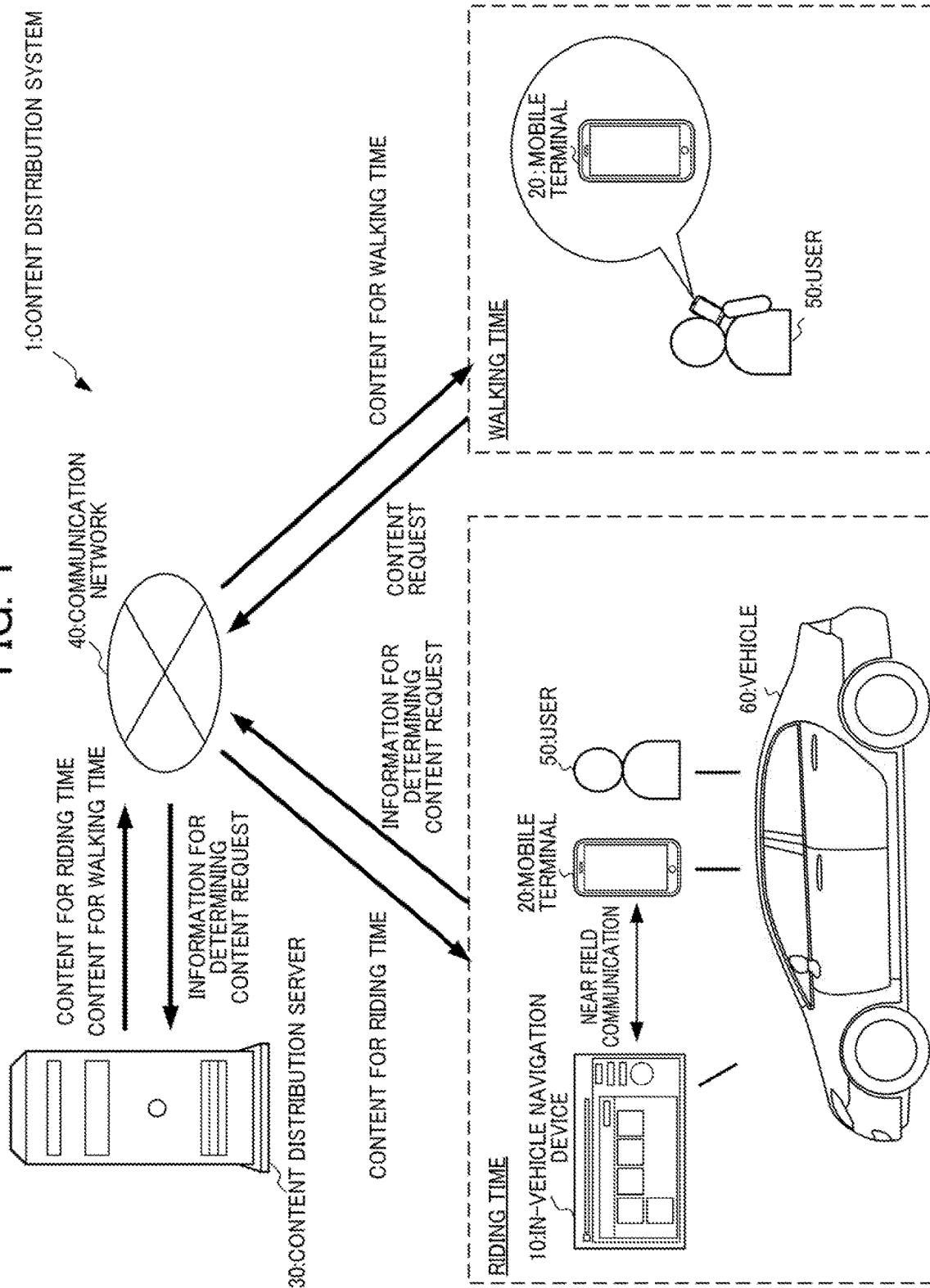
FIG. 1 is a block diagram illustrating a basic configuration of the entire content distribution system corresponding to each embodiment of the present invention.

The entire configuration of the content distribution system 1 that is common to each of the embodiments will be described with reference to FIG. 1. As illustrated in FIG. 1, the content distribution system 1 is configured by including an in-vehicle navigation device 10, a mobile terminal 20, and a content distribution server 30. Each device and each terminal can be connected to communicate with each other through a communication network 40.

In addition, on the left side in the drawing, "at Time of Getting in Vehicle" indicates a situation in which the in-vehicle navigation device 10 is provided in a vehicle 60, and a user 50 is getting in the vehicle 60, and uses the in-vehicle navigation device 10 and the mobile terminal 20. In addition, on the right side in the drawing, "at Time of Walking" indicates a situation in which the user 50 moves by foot, and uses the mobile terminal 20. Furthermore, for the convenience of description, the description of "at Time of Walking" may include a case where the user moves by a movement means such as a bicycle, in addition to by foot. In this embodiment, it is distinguished whether the user 50 is getting in the vehicle 60 that is capable of being arbitrarily moved or moves by a movement means other than the vehicle 60.

The in-vehicle navigation device 10 is a device that performs route guidance (car navigation) with respect to the user 50 getting in the vehicle 60. The in-vehicle navigation device 10 performs route guidance from a current position to a destination, on the basis of the request of the user 50. In addition, the in-vehicle navigation device 10 also has a function of positioning position information of the in-vehicle navigation device 10 (that is, position information of the vehicle 60). The in-vehicle navigation device 10 suitably transmits information such as the position information to the content distribution server 30, as information for determination. The details of the information for determination will be described below. The in-vehicle navigation device 10 can be realized by a car navigation device fixed to the vehicle 60 that is a movable body, or a portable navigation device (PND) that is simply disposed on the vehicle 60 that is the movable body, and can be transported.

The mobile terminal 20 is a mobile terminal that is used when the user 50 getting in the vehicle 60 or moves by foot. The mobile terminal 20 performs the distribution request of content with respect to the content distribution server 30. In addition, contents that are transmitted by the content distribution server 30 are received and output (for example, the content is displayed), as a response for the distribution request. The mobile terminal 20 can be realized by a smart phone, a portable telephone, a tablet terminal, a laptop computer, and other portable electronic devices.

The content distribution server 30 is a server that distributes the contents with respect to the mobile terminal 20. The processing of the content distribution server 30 is the gist of each of the embodiments of the present invention. More specifically, the content distribution server 30 determines whether the user 50 of the mobile terminal 20 is getting in a vehicle (that is, the user 50 moves by the vehicle 60) or the user 50 is walking (that is, the user 50 moves by foot), on the basis of the information for determination. Then, in a case where it is determined that the user 50 is getting in a vehicle, contents at the time of getting in a vehicle corresponding to a case where the user is getting in a vehicle are distributed to the mobile terminal 20. On the other hand, in a case where it is determined that the user 50 is walking, contents at the time of walking corresponding to a case where the user is walking are distributed to the mobile terminal 20.

In each of the embodiments of the present invention, an effect is obtained in which such a content distribution server 30 performs the determination using the information for determination, and thus, it is possible to distribute contents according to a movement means, after more accurately determining the movement means.

The content distribution server 30 performing such processing, for example, can be realized by incorporating unique software this embodiment in a general-purpose server device.

The communication network 40 is realized by a network such as the Internet or a portable telephone network, and a network such as a combination thereof.

The vehicle 60 is a movable body in which the user 50 of the in-vehicle navigation device 10 or the mobile terminal 20 gets. The vehicle 60, for example, is realized by a four-wheel vehicle, a motorcycle, a bicycle, or the like.

Furthermore, in the drawing, information to be transmitted and received with respect to each device and each terminal is illustrated, but such information is merely an example. In this embodiment, information other than the illustrated information items may be transmitted and received. In addition, the number of devices and the number of terminals included in this embodiment, and the number of users 50 are not particularly limited. As described above, the entire configuration that is common to each of the embodiments will be described. Next, a specific configuration of each device in the first embodiment, and an operation of each device will be described.

First Embodiment

<Functional Block of In-Vehicle Navigation Device 10>
A functional block of the in-vehicle navigation device 10 will be described with reference to a block diagram of FIG. 2. Here, the in-vehicle navigation device 10 receives the supply of a power source from the vehicle 60. Then, an ignition switch of the vehicle 60 is set to On (an engine is activated) by the user 50 getting in the vehicle 60, the in-vehicle navigation device 10 is automatically activated. In addition, the in-vehicle navigation device 10 is operated until an ignition-switch-off state of the vehicle 60 is set by the user 50 getting in the vehicle 60 (the engine is suspended). As described above, activation states of the in-vehicle navigation device 10 and the vehicle 60 are engaged with each other.

Figure 2:
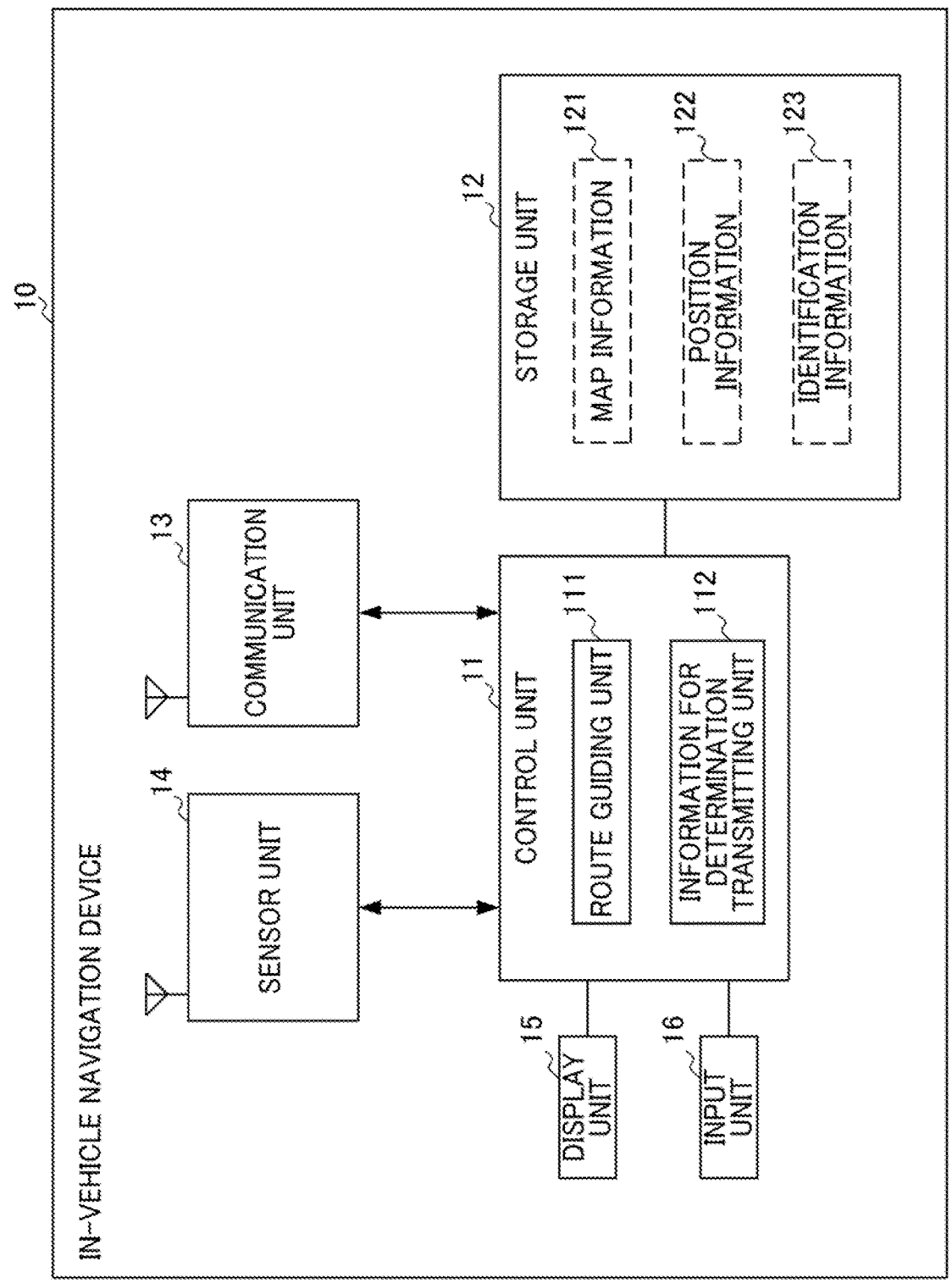
FIG. 2 is a functional block diagram illustrating a functional configuration of an in-vehicle navigation device in each of the embodiments of the present invention.

As illustrated in FIG. 2, the in-vehicle navigation device 10 is configured by including a control unit 11, a storage unit 12, a communication unit 13, a sensor unit 14, a display unit 15, and an input unit 16.

The control unit 11 is configured of an arithmetic processing device such as a microprocessor, and controls each unit configuring 10. The details of the control unit 11 will be described below.

The storage unit 12 is configured of a semiconductor memory or the like, and stores each program such as a control program referred to as firmware or an operating system, a program for performing route guidance processing, and a program for performing transmission processing of the information for determination with respect to the content distribution server 30, and various information items such as map information. In the drawing, map information 121 for performing the route guidance processing, and position information 122 and identification information 123 for performing transmission processing of the information for determination are illustrated as the information stored in the storage unit 12.

The map information 121 includes information such as information relevant to a feature such as a road or a facility, road information, facility position information, and parking lot information. In addition, the map information 121 includes road network data including map data for displaying a road, a background of a road map, and the like, position information of a node (for example, an intersection, a bending point, a corner point, or the like of the road) and type information thereof, position information of a link that is a route connecting the nodes and type information thereof, link cost data relevant to cost information of all of the links (for example, a distance, required time, or the like), and the like.

So-called road map information such as the type of road or a traffic light is stored as the road information. In the facility position information, the position information of each of the facilities is stored as latitude and longitude information. In addition, the facility position information may include incidental information such as identification information (a facility ID), a name, facility classification (and/or genre), a telephone number, an address, and an opening hour of the facility, and in a case where the facility is a restaurant, a menu to be provided, and facility information relevant to merchandise service or the like. In the parking lot information, position information of the parking lot is stored as the latitude and longitude information. In a case where the parking lot is a parking lot of each of the facilities, the facility and the parking lot are stored by being associated with each other.

The position information 122 is the position information of the in-vehicle navigation device 10 (that is, the position information of the vehicle 60) that is positioned by the sensor unit 14 described below. The position information 122 may include a positioning time that is not only information indicating a position that is positioned, but also a time for performing positioning.

In addition, the identification information 123 is information for identifying the vehicle 60 in which in-vehicle navigation device 10 is provided. For example, a vehicle identification number (VIN) or a number of a number plate that is intrinsically applied to the vehicle 60 can be used as the identification information 123. In addition, information relevant to the in-vehicle navigation device 10 may be used as the identification information 123 for identifying the vehicle 60. For example, a production number or the like that is uniquely assigned to the in-vehicle navigation device 10 can be used as the identification information 123. In addition, in order for the communication unit 13 to be connected to the communication network 40 that is a network such as a portable telephone network, a telephone number applied to a subscriber identity module (SIM) that is inserted into the communication unit 13 can be used as the identification information 123.

Each of the information items stored in the storage unit 12 may be configured by being stored in advance in the storage unit 12, or may be suitably configured by being downloaded from the content distribution server 30, other server devices (not illustrated), or the like that are connected to the communication network 40, as necessary. Further, the information may be suitably corrected in accordance with the input of the user 50.

The communication unit 13 includes a digital signal processor (DSP) or the like, and realizes wireless communication with respect to other devices (for example, the content distribution server 30) through the communication network 40, on the basis of a standard such as 3rd generation (3G), long term evolution (LTE), and Wi-Fi (registered trademark). The communication unit 13, for example, is used for an information for determination transmitting unit 112 described below to transmit the information for determination with respect to the content distribution server 30. However, data that is transmitted and received between the communication unit 13 and the other device is not particularly limited, and information other than the information items for determination may be transmitted and received.

The sensor unit 14, for example, is configured of a global positioning system (GPS) sensor, a gyro sensor, an acceleration sensor, and the like. The sensor unit 14 has a function as a position detection means detecting the position information, receives a GPS satellite signal from a GPS sensor, and positions the position information (a latitude and a longitude) of the in-vehicle navigation device 10. The positioning of the sensor unit 14 is performed at a predetermined time interval (for example, a three-second interval) as described above. The positioned position information is stored in the storage unit 12 as the position information 122.

Furthermore, in the sensor unit 14, it is possible to further increase a positioning accuracy of the position information of the in-vehicle navigation device 10 on the basis of an angular rate or an acceleration rate that is measured by a gyro sensor and an acceleration sensor. In addition, in a case where it is difficult to or it is not possible to perform GPS communication, the sensor unit 14 is also capable of calculating the position information of the in-vehicle navigation device 10 according to base station information acquired from the communication unit 13, by using assisted global positioning system (AGPS) communication.

The display unit 15 is configured of a display device such as a liquid crystal display and an organic electroluminescence panel. The display unit 15 receives an instruction from the control unit 11, and displays an image. Examples of the information displayed on the display unit 15 include the current position of the in-vehicle navigation device 10, map information of the vicinity of the current position of the in-vehicle navigation device 10 that is read out from the map information 121, a destination that is set by the user 50, meeting information that is notified from the other in-vehicle navigation device 10, local route information based on route information that is distributed from the content distribution server 30, other route information items, various user interfaces, and the like.

The input unit 16 is configured of an input device (not illustrated) such as a physical switch referred to as a numeric keypad or a touch panel that is disposed by being superimposed on a display surface of the display unit 15, and the like. A signal based on operation input from the input unit 16, such as the press of the numeric keypad of the user 50 and the touch of the touch panel, is output to the control unit 11, and thus, a selection operation of the user 50 and a scaling operation of a map can be realized.

Furthermore, even though it is not illustrated, a speaker, a microphone, or the like can be provided in the in-vehicle navigation device 10. The speaker outputs a sound with respect to a driver, and the microphone collects a sound generated by the driver. As described above, information can be output from the speaker as a sound, or various selections or instructions of the driver to whom a sound is input through the microphone can be input into the control unit 11 by a sound recognition technology.

Next, the details of the control unit 11 will be described. The control unit 11 is configured of a microprocessor including a central processing unit (CPU), a random access memory (RAM), a read only memory (ROM), input/output (I/O), and the like. The CPU executes each program that is read out from the ROM or the storage unit 12, reads out the information from the RAM, the ROM, and the storage unit 12 when the program is executed, and writes the information with respect to the RAM and the storage unit 12, and thus, performs the delivery of the signal with respect to the communication unit 13, the sensor unit 14, the display unit 15, and the input unit 16. Then, hardware and software (a program) cooperate with each other, and thus, the processing of this embodiment is realized.

The control unit 11 includes a route guiding unit 111 and the information for determination transmitting unit 112, as a functional block. The route guiding unit 111 is a portion performing route guidance processing to the destination such as a facility that is input or selected by the user 50. The route guidance processing to the destination is identical to route guidance processing in a general car navigation system. That is, the route guiding unit 111 generates a map to the destination, on the basis of the map information 121 that is stored in the storage unit 12, superimposes the current position of the in-vehicle navigation device 10 that is positioned by the sensor unit 14, the position of the destination, and the route information to the destination on the map, and displays the information on the display unit 15, and thus, is capable of performing the route guidance. In this case, the route guiding unit 111 is capable of using the route information such as the local route information that is the route information distributed from the content distribution server 30, or general route information described below, as route information for route guidance.

Further, in this case, a sound for route guidance may be output from the speaker (not illustrated). In addition, information of a road congestion situation, weather information, or the like may be acquired through the communication of the communication unit 13, and the acquired information may be used in the route guidance processing. For example, a road situation (for example, a traffic snarl-up situation or the like) that is acquired from vehicle information communication system (VICS: registered trademark) or the like through the through the communication unit 13 may be used in the route guidance processing. Furthermore, the route guidance processing to the destination is well known for a person skilled in the art, and thus, the detailed description thereof will be omitted.

The information for determination transmitting unit 112 is a portion transmitting the information for determination with respect to the content distribution server 30, by wireless communication using the communication unit 13. In this embodiment, in a case where the information for determination is inquired from the content distribution server 30, the information for determination transmitting unit 112 transmits the information for determination with respect to the content distribution server 30, as a response thereof. Here, the information for determination in this embodiment includes the identification information 123 that is identification information of the vehicle 60 provided with the in-vehicle navigation device 10. In addition, the information for determination includes any one or both of activation information that is information indicating whether or not the vehicle 60 is activated and the position information 122 that is stored in the storage unit 12.

It is considered that data indicating an activation state of the vehicle 60 (for example, data of a flag indicating an activation state) is included in the information for determination, as the activation information. However, in this embodiment, as described above, the activation state of the vehicle 60 and an activation state of the in-vehicle navigation device 10 are engaged with each other. For this reason, it is indicated that the in-vehicle navigation device 10 is capable of transmitting the information for determination, that is, the vehicle 60 is also activated. For this reason, even in a case where the data indicating the activation state (for example, the data of the flag indicating the activation state) is not particularly included in the information for determination, the activation information is substantially included.

However, in a case where the in-vehicle navigation device 10 includes a battery or the like, there may be a case where the in-vehicle navigation device 10 is activated regardless of the activation of the vehicle 60. That is, there is also a case where the activation states of the in-vehicle navigation device 10 and the vehicle 60 are not engaged with each other. In this case, the in-vehicle navigation device 10 monitors whether or not the vehicle 60 is activated, and the data as the activation information (for example, the data of the flag indicating the activation state) is further included in the information for determination, on the basis of a monitoring result.

<Functional Block of Mobile Terminal 20>

Next, a functional block of the mobile terminal 20 will be described with reference to a block diagram of FIG. 3. Here, the mobile terminal 20 receives the supply of a power source from a battery (not illustrated) provided therein, and thus, the in-vehicle navigation device 10 described above is operated without receiving the supply of the power source from the vehicle 60. However, in order to charge the battery, the mobile terminal 20 may receive the supply of the power source from a cigarette socket or the like of the vehicle 60.

Figure 3:
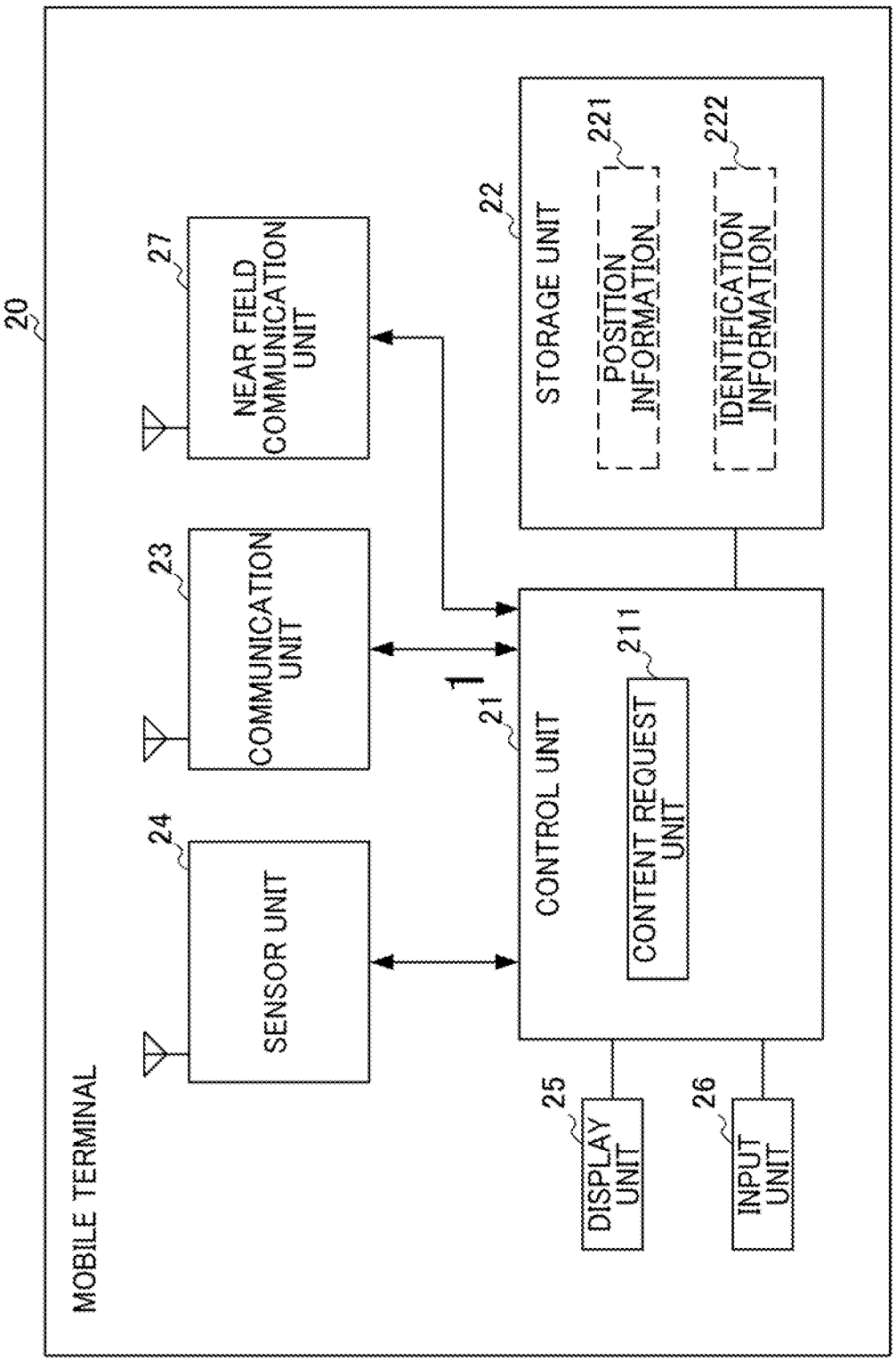
FIG. 3 is a functional block diagram illustrating a functional configuration of a mobile terminal in a first embodiment and a second embodiment of the present invention.

As illustrated in FIG. 3, the mobile terminal 20 is configured by including a control unit 21, a storage unit 22, a communication unit 23, a sensor unit 24, a display unit 25, an input unit 26, and a near field communication unit 27. Here, the storage unit 22, the communication unit 23, the sensor unit 24, the display unit 25, and the input unit 26 have the same functions as those of the functional blocks of the same names included in the in-vehicle navigation device 10 described above. That is, each of the functional blocks of the mobile terminal 20 will be described by replacing the "in-vehicle navigation device 10" in the description of the in-vehicle navigation device 10 described above with the "mobile terminal 20", and by replacing reference numerals of the functional blocks of the same names, and thus, the overlapping description will be omitted.

On the other hand, the mobile terminal 20 is different from the in-vehicle navigation device 10 in that a functional block provided in the control unit 21 is different and the mobile terminal 20 includes the near field communication unit 27, and thus, the difference will be described below.

As with the control unit 11, the control unit 21 is configured of an arithmetic processing device such as a microprocessor, and controls each unit configuring the mobile terminal 20. In addition, hardware and software (a program) cooperate with each other, and thus, the control of the control unit 21 is realized. Such a point is identical to that of the control unit 11, and thus, the repeated description thereof will be omitted.

Unlike the control unit 11, the control unit 21 includes a content request unit 211 as a functional block. The content request unit 211 is a portion transmitting a content distribution request with respect to the content distribution server 30. Here, the content distribution request in this embodiment includes at least the identification information 222 that is stored in the storage unit 22. Further, the content distribution request may include the position information 222 (that is, the position information of the mobile terminal 20) that is stored in the storage unit 22.

Then, the content distribution server 30 distributes the contents with respect to the mobile terminal 20, as a response of the content distribution request. Furthermore, such transmission and reception are performed through the communication unit 23. Here, the contents, for example, are any one of a still image, a moving image, and a sound, a combination thereof, or the like. The content distribution server 30 distributes data of the still image, the moving image, or the sound configuring the contents, uniform resource locator (URL) for browsing the contents on a network, and the like. At this time, the content distribution server 30 distributes the contents in accordance with whether the user 50 of the mobile terminal 20 is getting in a vehicle or is walking, as described above.

The transmission of the content distribution request of the content request unit 211 may be periodically performed, and may be performed triggered by receiving an operation corresponding to the content distribution request from the user 50 by the input unit 26. In addition, the contents that are distributed from the content distribution server 30 (or the contents that are acquired by the content request unit 211 on the basis of the distributed URL) are displayed on the display unit 25. Further, in a case where a sound is included in the contents, the contents are output from a speaker (not illustrated).

The near field communication unit 27 is a portion for performing non-contact near field communication based on a standard such as near field communication (NFC) or Bluetooth (registered trademark), or wired near field communication through a universal serial bus (USB) cable or the like. In response to this, the in-vehicle navigation device 10 or the vehicle 60 includes a near field communication unit for performing communication with respect to the near field communication unit 27. In this case, for example, an electronic control unit (ECU) of the vehicle 60 includes the near field communication unit.

Then, there is a case where the mobile terminal 20 is capable of performing the communication with respect to the in-vehicle navigation device 10 or the vehicle 60 through the near field communication, that is, a case where the mobile terminal 20 exists in the vehicle 60. In this case, the position information of the mobile terminal 20 that is positioned by the sensor unit 24 corresponds to the position information of the vehicle 60.

Furthermore, in a case where the vehicle 60 has a function of positioning the position information, the mobile terminal 20 may acquire position information that is positioned by the vehicle 60 but not the position information that is positioned by the sensor unit 24. In this case, the sensor unit 24 may be omitted from the mobile terminal 20.

<Functional Block of Content Distribution Server 30>

Next, a functional block of the content distribution server 30 will be described with reference to a block diagram of FIG. 4.

Figure 4:
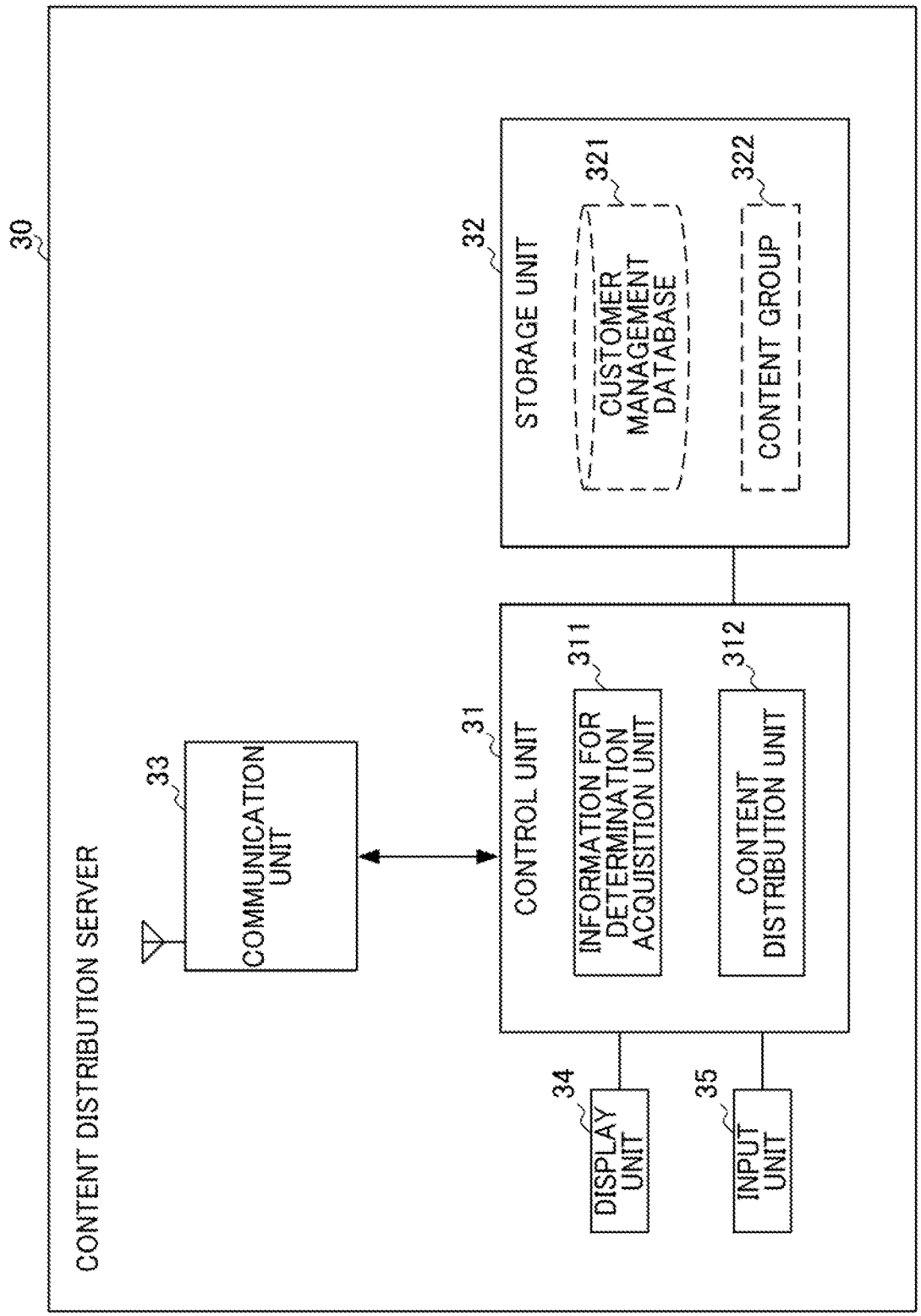
FIG. 4 is a functional block diagram illustrating a functional configuration of a content distribution server in the first embodiment and a third embodiment of the present invention.

As illustrated in FIG. 4, the content distribution server 30 is configured by including a control unit 31, a storage unit 32, a communication unit 33, a display unit 34, and an input unit 35.

The control unit 31 is configured of an arithmetic processing device such as a microprocessor, and controls each unit configuring 30. The details of the control unit 31 will be described below.

The storage unit 32 is configured of a semiconductor memory or the like, and stores a control program referred to as firmware or an operating system, each program such as a program for performing content distribution, a customer management database for managing customers, and various information items such as various contents. In the drawing, a customer management database 321 and a content group 322 that are information relevant to content distribution processing of the content distribution server 30 are illustrated as the information stored in the storage unit 32.

The customer management database 321 is a database in which identification information of the mobile terminal 20 and the identification information of the vehicle 60 are associated with each other for each user. The customer management database 321, for example, is constructed and updated on the basis of the identification information that is acquired at the time of selling the vehicle 60 or at the time of registering user information for receiving the content distribution in this embodiment. Furthermore, in this embodiment, it is assumed that the customer management database 321 is constructed and updated by an external device (not illustrated), and is transmitted to the content distribution server 30. However, as a modification thereof, the customer management database 321 may be constructed and updated by the content distribution server 30.

An example of the customer management database 321 will be described with reference to FIG. 5. As illustrated in FIG. 5, the customer management database 321 includes a "User ID", a "Vehicle ID", and a "Mobile terminal ID", as an attribute. Here, the "User ID" is identification information for identifying the user, and for example, is realized by the name of the user, and unique information assigned for each of the users (for example, a combination of text data items). In addition, the "Vehicle ID" is identification information for identifying the vehicle 60, and for example, is realized by unique information assigned for each of the vehicles 60 (for example, a combination of text data items), as with the user ID. Furthermore, the vehicle ID is information corresponding to the identification information 123 that is stored in the in-vehicle navigation device 10. Further, the "Mobile terminal ID" is identification information for identifying the mobile terminal 20, and for example, is realized by unique information assigned for each of the mobile terminals 20 (for example, a combination of text data items), as with the user ID. Furthermore, the mobile terminal ID is information corresponding to the identification information 222 that is stored in the mobile terminal 20.

The information corresponding to each of the attributes is stored in each field of the customer management database 321. Furthermore, as with a customer ID "AAA", a customer ID, a vehicle ID, and a mobile terminal ID may be associated with each other on a one-to-one basis, as with a customer ID "BBB", a plurality of mobile terminals ID may be associated with one vehicle ID, or as with a customer ID "CCC", a plurality of vehicles ID and mobile terminals ID may be associated with one customer ID. That is, the IDs can be associated with each other on a one-to-one basis, on a one-to-many basis, or a many-to-many basis.

The content group 322 is a group of the contents that are distributed with respect to the mobile terminal 20 by the content distribution server 30, as a response of the content distribution request. The content group 322 includes a plurality of contents. In addition, the content is not particularly limited, and in this embodiment, also includes contents relevant to a facility. The facility is not also particularly limited, and for example, also includes a facility such as a restaurant or a merchandising store.

As described above, the contents, for example, are any one of the still image, the moving image, and the sound, the combination thereof, or the like. The content distribution server 30 distributes the data of the still image, the moving image, or the sound configuring the contents, uniform resource locator (URL) for browsing the contents on the network, and the like. Furthermore, the content distribution server 30 distributes the contents in accordance with whether the user 50 of the mobile terminal 20 is getting in a vehicle or is walking, as described above. A specific example of the contents that are included in the content group 322 will be described below.

The communication unit 33 includes a digital signal processor (DSP) or the like, and realizes wireless communication with respect to other devices through the communication network 40, on the basis of a standard such as 3rd generation (3G), long term evolution (LTE), and Wi-Fi (registered trademark). The communication unit 33, for example, is used for receiving the information for determination that is transmitted from the in-vehicle navigation device 10 or the content distribution request that is transmitted from the mobile terminal 20. In addition, the communication unit 33, for example, is used for transmitting the inquiry of the information for determination with respect to the in-vehicle navigation device 10 or for transmitting the contents with respect to the mobile terminal 20. However, the data that is transmitted and received between the communication unit 33 and the other device is not particularly limited, and information other than the information items may be transmitted and received.

The display unit 34 is configured of a display device such as a liquid crystal display and an organic electroluminescence panel. The display unit 34 receives an instruction from the control unit 31, and displays an image. The input unit 35 is configured of an input device (not illustrated) such as a keyboard or a mouse, and the like. The display unit 34 and the input unit 35, for example, are used by a manager managing the content distribution server 30, and the like.

Next, the details of the control unit 31 will be described. The control unit 31 is configured of a microprocessor including a central processing unit (CPU), a random access memory (RAM), a read only memory (ROM), input/output (I/O), and the like. The CPU executes each program that is read out from the ROM or the storage unit 32, reads out the information from the RAM, the ROM, and the storage unit 32 when the program is executed, and writes the information with respect to the RAM and the storage unit 32, and thus, performs the delivery of the signal with respect to the communication unit 33, the display unit 34, and the input unit 35. Then, hardware and software (a program) cooperate with each other, and thus, the processing of this embodiment is realized.

The control unit 31 includes an information for determination acquisition unit 311 and a content distribution unit 312, as a functional block. In a case where there is the content distribution request from the content request unit 211 of the mobile terminal 20, the information for determination acquisition unit 311 inquires for the information for determination with respect to the information for determination transmitting unit 112 of the in-vehicle navigation device 10. Then, as a response thereof, the information for determination transmitting unit 112 receives the information for determination to be transmitted, and thus, acquires the information for determination. The information for determination that is acquired by the information for determination acquisition unit 311 is output with respect to the content distribution unit 312.

Here, in this embodiment, the number of mobile terminals 20 or the number of in-vehicle navigation devices 10 is not limited, and there are a plurality of mobile terminals 20 and a plurality of in-vehicle navigation devices 10. In addition, the users 50 using each of the mobile terminals 20 and the in-vehicle navigation devices 10 are different from each other. For this reason, in a case where the content distribution request is received from any one mobile terminal 20, it is necessary for the information for determination acquisition unit 311 to perform the inquiry with respect to the in-vehicle navigation device 10 corresponding to the mobile terminal 20 of a distribution request source, without performing the inquiry with respect to all of the in-vehicle navigation devices 10.

There are two methods as a method for the content distribution unit 312 to specify the in-vehicle navigation device 10 corresponding to the mobile terminal 20 of the distribution request source. First, a first method is a method in which the in-vehicle navigation device 10 corresponding to the mobile terminal 20 of the distribution request source is specified by using the association in the customer management database 321. As described above, the content distribution request in this embodiment includes the identification information 222 that is stored in the storage unit 22. Then, the content distribution unit 312 is capable of specifying the in-vehicle navigation device 10 corresponding to the mobile terminal 20 of the distribution request source, on the basis of the association between the identification information 222 and the customer management database 321.

In addition, a second method is a method using the position information. In a case where the content distribution request includes the position information 222 that is information indicating the position of the mobile terminal 20, the position information 222, is compared with the position information (the position information 122) of each the in-vehicle navigation devices 10. Then, in a case where a position that is specified by the position information 222 and a position that is specified by the position information (the position information 122) of any one in-vehicle navigation device 10 are in a predetermined range, it is possible to specify that the in-vehicle navigation device 10 is the in-vehicle navigation device 10 corresponding to the mobile terminal 20 of the distribution request source. Furthermore, the predetermined range can be an arbitrary range in accordance with a positioning accuracy of each of the sensor units of the in-vehicle navigation device 10 or the mobile terminal 20, and the like. Here, in order to realize the second method, it is necessary for the information for determination acquisition unit 311 to periodically acquire the information for determination including the position information (the position information 122) of each of the in-vehicle navigation devices 10. The details of the periodic acquisition will be described below as the description of a second embodiment.

By any method, in a case where the in-vehicle navigation device 10 corresponding to the mobile terminal 20 of the distribution request source is specified, the information for determination acquisition unit 311 inquires for the information for determination with respect to the specified in-vehicle navigation device 10. The information for determination acquisition unit 311 acquires the information for determination that is transmitted from the in-vehicle navigation device 10, as a response of the inquiry. Then, the information for determination acquisition unit 311 outputs the acquired information for determination with respect to the content distribution unit 312.

The content distribution unit 312 is a portion distributing any content of the plurality of contents in the content group 322 that is stored in the storage unit 32, with respect to the mobile terminal 20. The content distribution unit 312 determines whether or not the user 50 is capable of visiting to a facility corresponding to the content by the vehicle 60, on the basis of the information for determination that is acquired by the information for determination acquisition unit 311.

Specifically, in a case where the activation information included in the information for determination indicates that the vehicle 60 is activated, it is determined that the user 50 is capable of visiting to the facility corresponding to the content by the vehicle 60. On the other hand, in a case where the activation information included in the information for determination does not indicate that the vehicle 60 is activated, it is determined that the user 50 is not capable of visiting to the facility corresponding to the content by the vehicle 60. In addition, in a case where the information for determination is transmitted with respect to the inquiry from the in-vehicle navigation device 10, it is considered that the vehicle 60 supplying the power source to the in-vehicle navigation device 10 is not activated, and thus, in such a case, it is also determined that the user 50 is not capable of visiting to the facility corresponding to the content by the vehicle 60.

Then, the content distribution unit 312 determines whether or not any content of the plurality of contents included in the content group 322 that is stored in the storage unit 32 is distributed with respect to the mobile terminal 20, on the basis of a determination result. The distributed content is output with respect to the user 50 by the method described above as the description of the mobile terminal 20.

<Specific Example of Contents to Be Distributed>

Next, a specific example of the contents that are distributed with respect to the mobile terminal 20 from the content distribution unit 312 will be described with reference to FIG. 6 and FIG. 7. Hereinafter, a case where the distributed content is displayed on the display unit 25 of the mobile terminal 20 will be described as an example.

First, an example of contents to be distributed in a case where the content distribution unit 312 determines that the user 50 is capable of visiting to the facility corresponding to the content by the vehicle 60 will be described with reference to FIG. 6. In this case, contents considering that the user 50 is capable of visiting to the facility by the vehicle 60 are distributed. For example, the content of a facility that is provided with a parking lot for parking the vehicle 60 is distributed.

Figure 6:
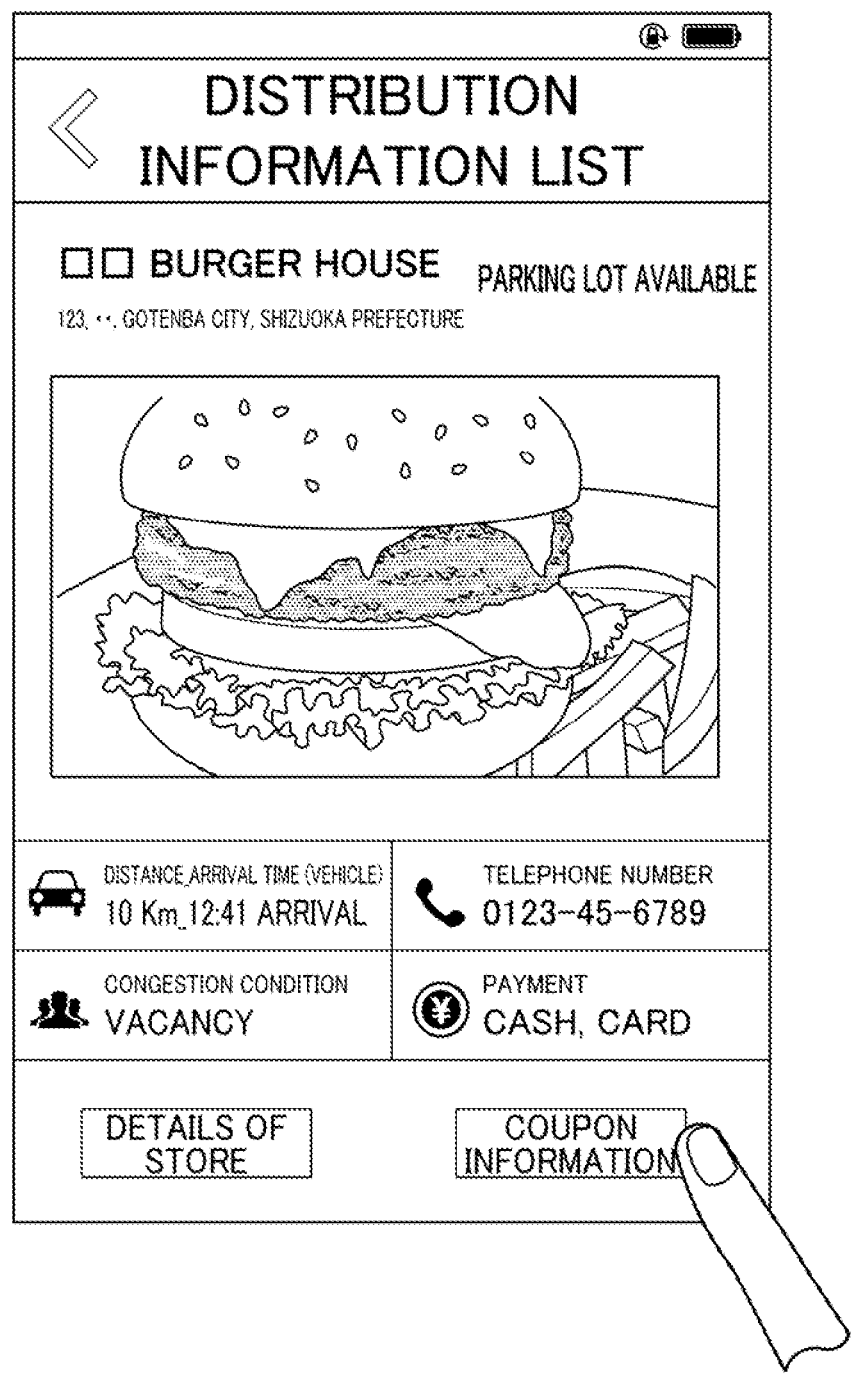
FIG. 6 is a diagram illustrating an example of contents to be distributed in each of the embodiments of the present invention.
Figure 7:
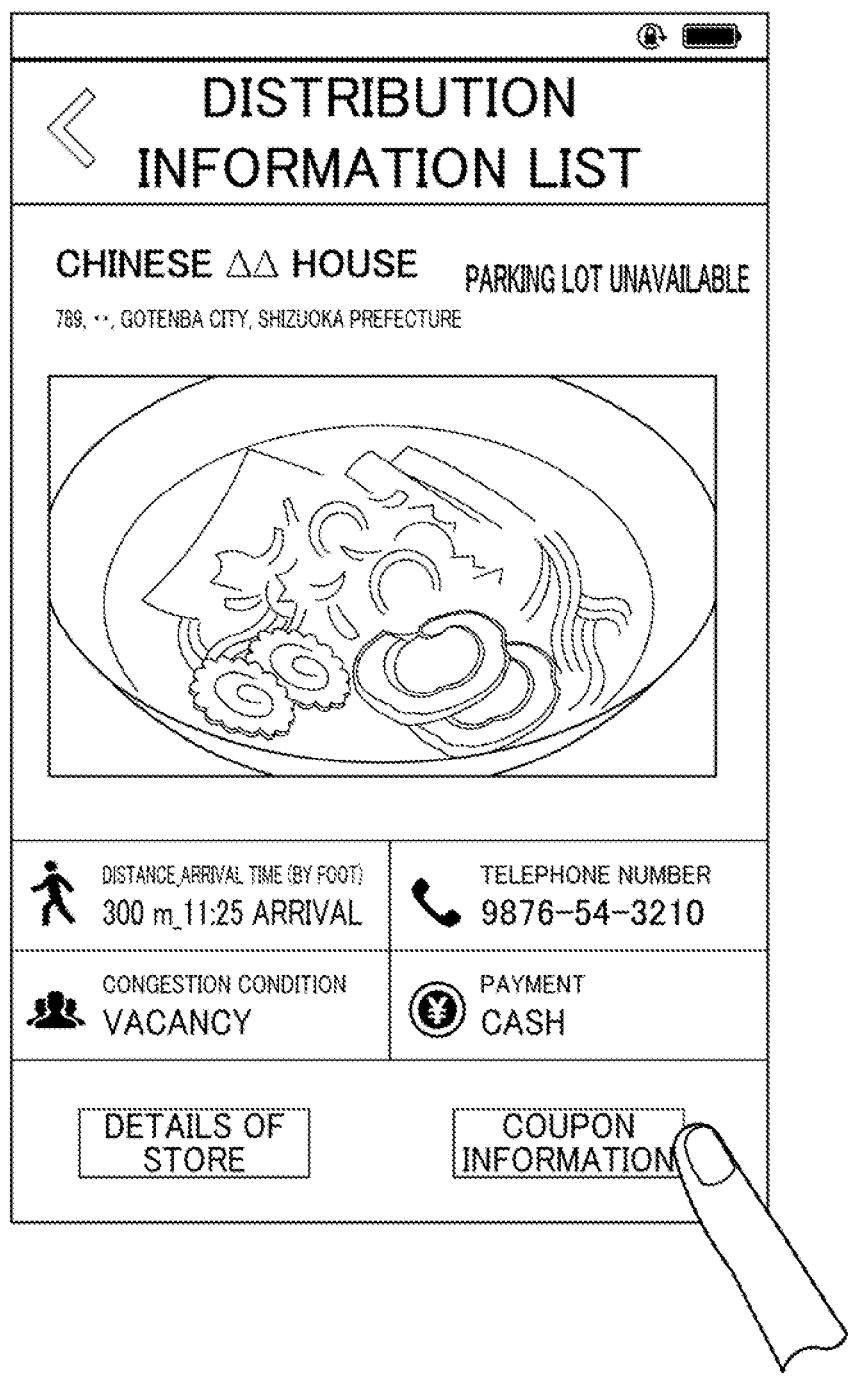
FIG. 7 is a diagram illustrating another example of the contents to be distributed in each of the embodiments of the present invention.

In the example of FIG. 6, information of a restaurant of "□□ Burger House" that is a facility provided with a parking lot is displayed as the content. The content includes not only information of "Parking Lot Available" indicating that a parking lot is provided, but also information such as an address or a telephone number of a store, or information of images of products to be provided.

In addition, in a case where the content distribution request includes the position information 222 that is the information indicating the position of the mobile terminal 20, the content of a distant facility that is in a distance to which the user is capable of moving from the position that is specified by the position information 222 by the vehicle 60, but is difficult to move by foot may be distributed. In this case, a distance to the store from the position that is specified by the position information 222, an estimated arrival time in a case where the user moves to the store by the vehicle 60, or the like may be included as illustrated in FIG. 6. Furthermore, in this case, the content distribution server 30 may further have a function for route guidance or information such as the map information.

Further, for example, in a case where the display unit 25 is realized by a touch panel, as illustrated in FIG. 6, an operation button such as "Details of Store" or "Coupon Information" is displayed, and in a case where the user presses such an operation button by an operation, more contents corresponding to "Details of Store", "Coupon Information", or the like may be displayed.

The more contents may be distributed along with the contents in the current display, and in a case where the operation button is pressed, the mobile terminal 20 and the content distribution server 30 communicate with each other, and thus, the more contents may be newly distributed. In addition, for example, the content of a coupon (contents) to be distributed may be contents premised on the fact that the user 50 is capable of visiting to the facility by the vehicle 60. For example, a free ticket of the parking lot, or the like may be distributed as the coupon (the contents), on the premise of the fact that the user 50 is capable of visiting to the facility by the vehicle 60.

Next, an example of contents to be distributed in a case where the content distribution unit 312 determines that it is not possible for the user 50 to visit to the facility corresponding to the content by the vehicle 60 will be described with reference to FIG. 6. In this case, contents considering that the user 50 is not capable of visiting to the facility by the vehicle 60 are distributed. For example, the content of a facility that is not provided with a parking lot is also distributed without distinguishing whether or not the parking lot for parking the vehicle 60 is provided.

In the example of FIG. 6, information of a restaurant of "Chinese AA House" that is a facility not provided with a parking lot is displayed as the content. The content includes not only information of "Parking Lot Unavailable" indicating that a parking lot is not provided, but also information such as an address or a telephone number of a store, or information of images of products to be provided.

In addition, in a case where the content distribution request includes the position information 222 that is the information indicating the position of the mobile terminal 20, the content of a close facility that is in a distance to which the user is capable of moving from the position that is specified by the position information 222 by foot may be distributed. In this case, a distance to the store from the position that is specified by the position information 222, an estimated arrival time in a case where the user 50 moves to the store by foot, or the like may be included as illustrated in FIG. 6. Furthermore, in this case, the content distribution server 30 may further have a function for route guidance or information such as the map information.

Further, as with the example described with reference to FIG. 6, more contents corresponding to "Details of Store", "Coupon Information", or the like may be displayed. In addition, for example, the content of a coupon (contents) to be distributed may be contents premised on the fact that the user 50 is not capable of visiting to the facility by the vehicle 60. For example, a service ticket of an alcoholic drink that is not capable of being consumed while driving the vehicle 60, or the like may be distributed as the coupon (the contents), on the premise of the fact that user 50 visits to the facility by foot but not by the vehicle 60.

Operation of this Embodiment

Figure 8:
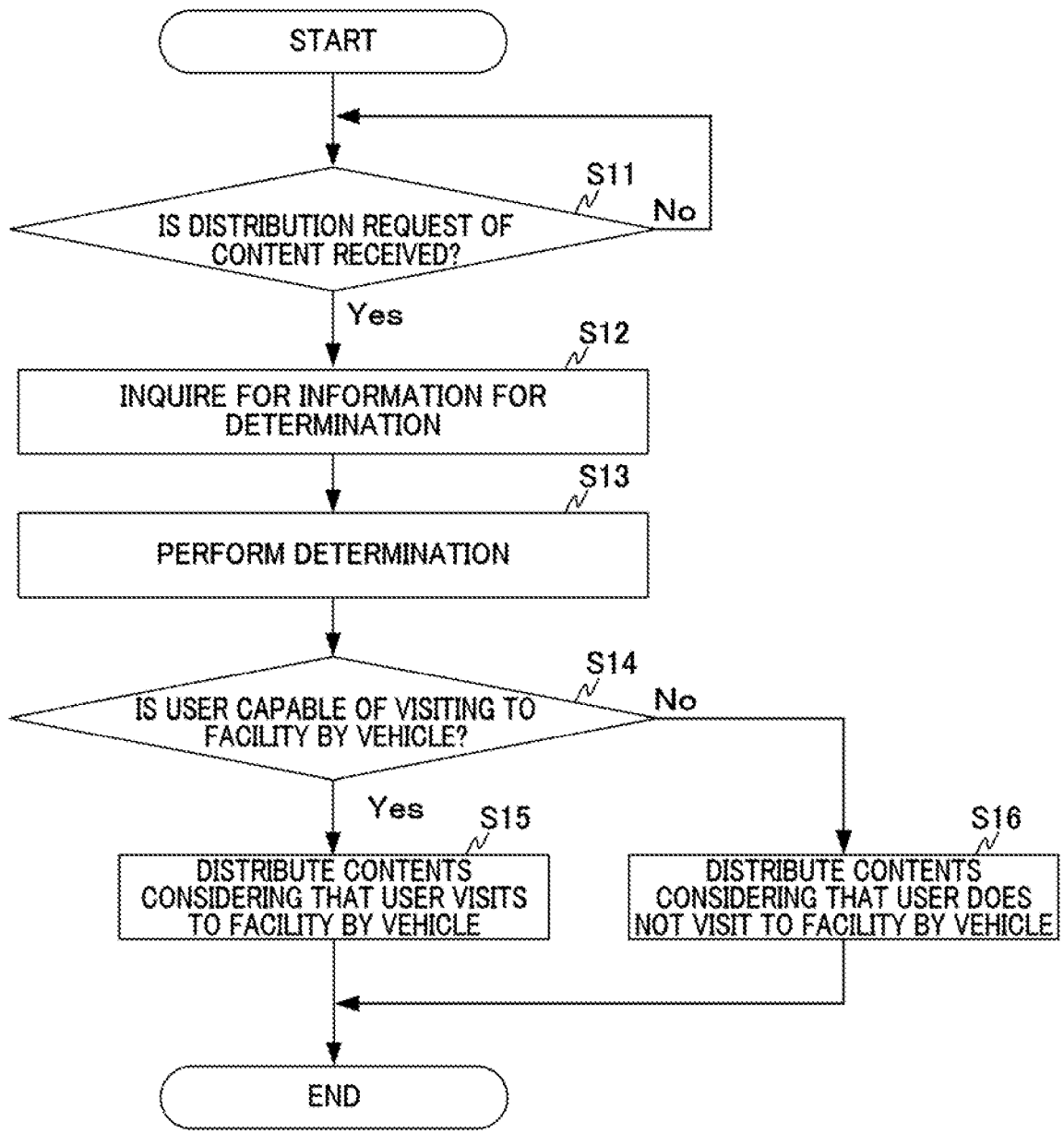
FIG. 8 is a flowchart illustrating a basic operation in each of the embodiments of the present invention.

Next, an operation at the time of distributing the contents in this embodiment will be described with reference to a flowchart of FIG. 8. First, in Step S11, the information for determination acquisition unit 311 determines whether or not the content distribution request is received from the mobile terminal 20. Here, in a case where the content distribution request is not received from the mobile terminal 20, in Step S11, it is determined as No, and the determination of Step S11 is repeated. On the other hand, in a case where the content distribution request is received from the mobile terminal 20, in Step S11, it is determined as Yes, and the processing proceeds to Step S12.

In Step S12, the information for determination acquisition unit 311 inquires for the information for determination with respect to the in-vehicle navigation device 10.

In Step S13, the content distribution unit 312 determines whether or not the user 50 is capable of visiting to the facility corresponding to the content by the vehicle 60, on the basis of the information for determination that is acquired by the information for determination acquisition unit 311. A specific determination method is as described above as the description of the information for determination acquisition unit 311.

In Step S14, the content distribution unit determines whether or not a determination result in Step S13 is a result that the user 50 is capable of visiting to the facility corresponding to the content by the vehicle 60. In a case where the determination result is the result that the user 50 is capable of visiting to the facility corresponding to the content by the vehicle 60, in Step S14, it is determined as Yes, and the processing proceeds to Step S15. On the other hand, in a case where the determination result is a result that the user 50 is not capable of visiting to the facility corresponding to the content by the vehicle 60, in Step S14, it is determined as No, and the processing proceeds to Step S16.

In Step S15, contents considering that the user 50 is capable of visiting to the facility corresponding to the content by the vehicle 60 are distributed. For example, the contents are distributed as described with reference to FIG. 6. Accordingly, this processing is ended. On the other hand, in Step S16, contents considering that the user 50 is not capable of visiting to the facility corresponding to the content by the vehicle 60 are distributed. For example, the contents are distributed as described with reference to FIG. 7. Accordingly, this processing is ended.

According to the operation described above, in this embodiment, it is possible to distribute contents according to a movement means as described with reference to FIG. 6 or FIG. 7, after more accurately determining the movement means on the basis of the information for determination that is acquired from the in-vehicle navigation device 10 provided in the vehicle 60.

Second Embodiment

Next, a second embodiment will be described. Here, the second embodiment is an embodiment in which it is determined which content is distributed to the mobile terminal by the content distribution server 30, on the basis of the information for determination that is started to be transmitted in accordance with the activation of the in-vehicle navigation device 10. Furthermore, a basic configuration, operation contents, and the like of this embodiment are common with the first embodiment. Therefore, hereinafter, the repeated description of the common points will be omitted, and differences from the first embodiment will be described in detail.

<In-Vehicle Navigation Device 10 of this Embodiment>
First, the in-vehicle navigation device 10 will be described. In the first embodiment, in a case where the information for determination is inquired from the content distribution server 30, the information for determination is transmitted with respect to the content distribution server 30 from the information for determination transmitting unit 112 of the in-vehicle navigation device 10. In contrast, in this embodiment, the information for determination is started to be transmitted with respect to the content distribution server 30 from the information for determination transmitting unit 112, in accordance with the activation of the in-vehicle navigation device 10.

Specifically, the transmission of the information for determination of the information for determination transmitting unit 112 with respect to the content distribution server 30 is periodically performed while the ignition switch of the vehicle 60 is set to On (the engine is activated) by the user 50 getting in the vehicle 60, and the in-vehicle navigation device 10 is automatically activated, and then, the ignition-switch-off state of the vehicle 60 (the engine is suspended) is set. For example, every time when the sensor unit 14 performs the positioning at a predetermined time interval (for example, a three-second interval), the information is transmitted in real time.

In addition, a plurality of information items (for example, including the position information 122 that is updated at a three-second interval for 3 minutes) may be transmitted at one time, instead of performing the transmission with respect to the content distribution server 30 in real time. That is, so-called burst transmission may be performed. The length of the predetermined time interval, and the real-time transmission or the burst transmission can be arbitrarily set in accordance with an environment where this embodiment is applied or the like. As described above, the real-time transmission or the burst transmission is performed, and thus, the information for determination transmitting unit 112 periodically transmits the information for determination with respect to the content distribution server 30.

Figure 9:
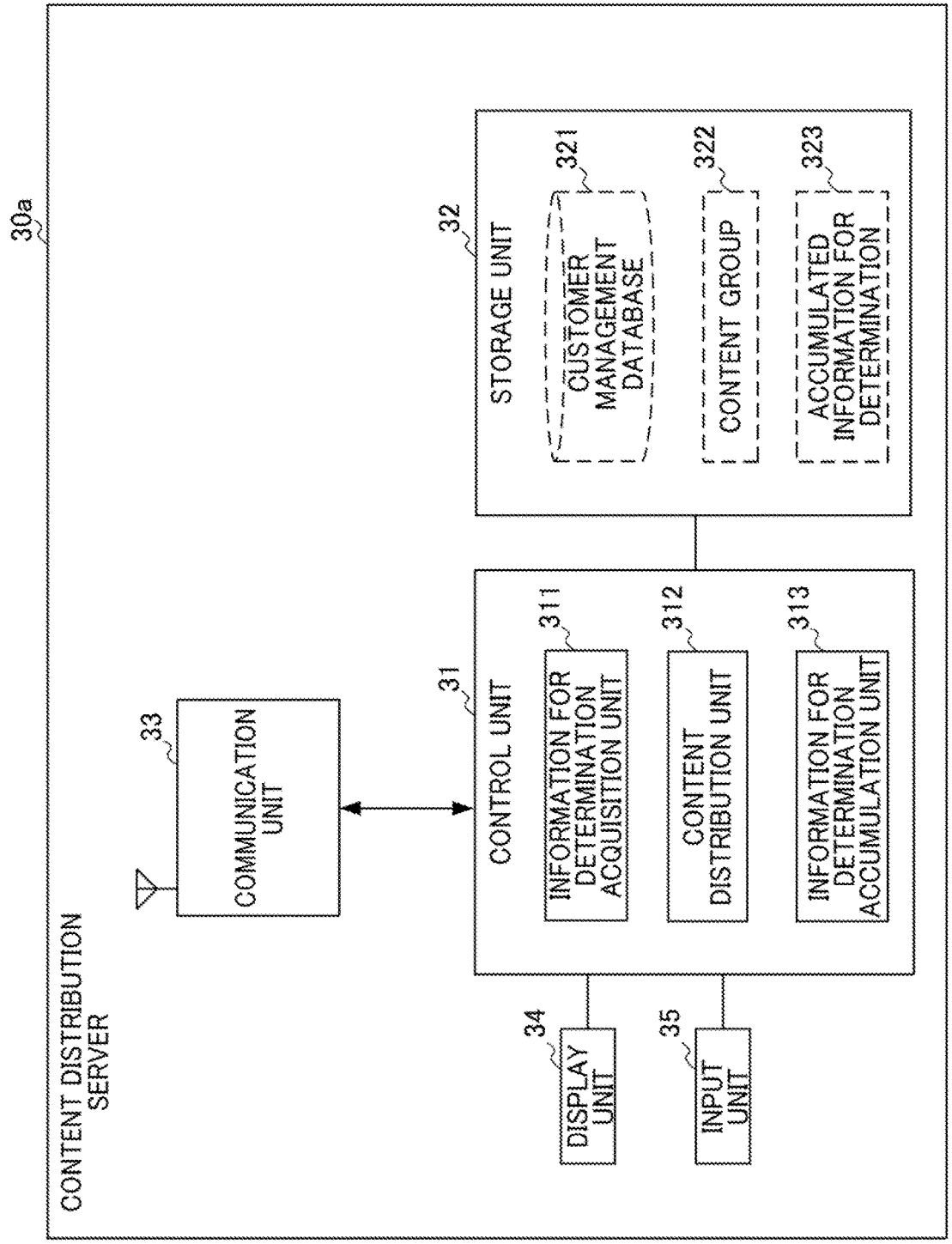
FIG. 9 is a functional block diagram illustrating a functional configuration of a content distribution server in the second embodiment of the present invention.

<Content Distribution Server 30 of this Embodiment>
Next, the configuration of a content distribution server 30a in this embodiment will be described with reference to a block of FIG. 9. The content distribution server 30a in this embodiment is different from the content distribution server 30 in the first embodiment described with reference to FIG. 4, in that an information for determination accumulation unit 313 is added, and the storage unit 32 stores accumulated information for determination 323.

As described above, the information for determination transmitting unit 112 of the in-vehicle navigation device 10 in this embodiment periodically transmits the information for determination with respect to the content distribution server 30. The content distribution server 30 includes the information for determination accumulation unit 313, accordance with such periodic transmission. Then, the information for determination accumulation unit 313 receives the information for determination that is periodically transmitted, and stores the received information for determination in the storage unit 32 as the accumulated information for determination 323. The accumulated information for determination 323 is information in which the identification information of each of the vehicles 60 in which the each of the in-vehicle navigation devices 10 is provided, and information indicating an activation state are associated with each other. The information for determination accumulation unit 313 updates the accumulated information for determination 323 every time when the information for determination that is periodically transmitted is received.

Operation of this Embodiment

In such a configuration, in a case where there is the content distribution request from the mobile terminal 20, the content distribution unit 312 in this embodiment acquires the in-information for determination corresponding to the in-vehicle navigation device 10 corresponding to the mobile terminal 20, with reference to the accumulated information for determination 323, without inquiring for the information for determination with respect to the in-vehicle navigation device 10 corresponding to the mobile terminal 20. That is, in this embodiment, an inquiry destination in Step S12 of FIG. 8 is different from that of the first embodiment.

After that, the processing subsequent to Step S13, and the processing of Step S11 are common to the first embodiment and this embodiment, and thus, the repeated description will be omitted.

As described above, in this embodiment, it is possible to distribute contents according to a movement means as described with reference to FIG. 6 or FIG. 7, after more accurately determining the movement means on the basis of the information for determination. In addition, in this embodiment, it is possible to omit the inquiry of the information for determination is inquired with respect to the in-vehicle navigation device 10 from the content distribution server 30, every time when there is the content distribution request from the mobile terminal 20.

In particular, it is preferable that this embodiment is implemented in an environment in which movement information or the like included in the information for determination is accumulated for a purpose other than the content distribution. For example, there is a system collecting the movement information of the vehicle 60 for the purpose of route guidance using a server, of the generation of traffic snarl-up information, of the analysis of the movement route of the user 50, or the like. By applying this embodiment to such a system, it is also possible to use the movement information that is collected for the other purpose, as the information for determination.

Third Embodiment

Next, a third embodiment will be described. Here, the third embodiment is an embodiment in which it is determined which content is distributed to the mobile terminal 20 by the content distribution server 30, on the basis of the information that is transmitted from the mobile terminal 20.

Furthermore, as with the second embodiment, a basic configuration, operation contents, and the like of this embodiment are common with the first embodiment. Therefore, hereinafter, the repeated description of the common points will be omitted, and differences from the first embodiment will be described in detail.

Figure 10:
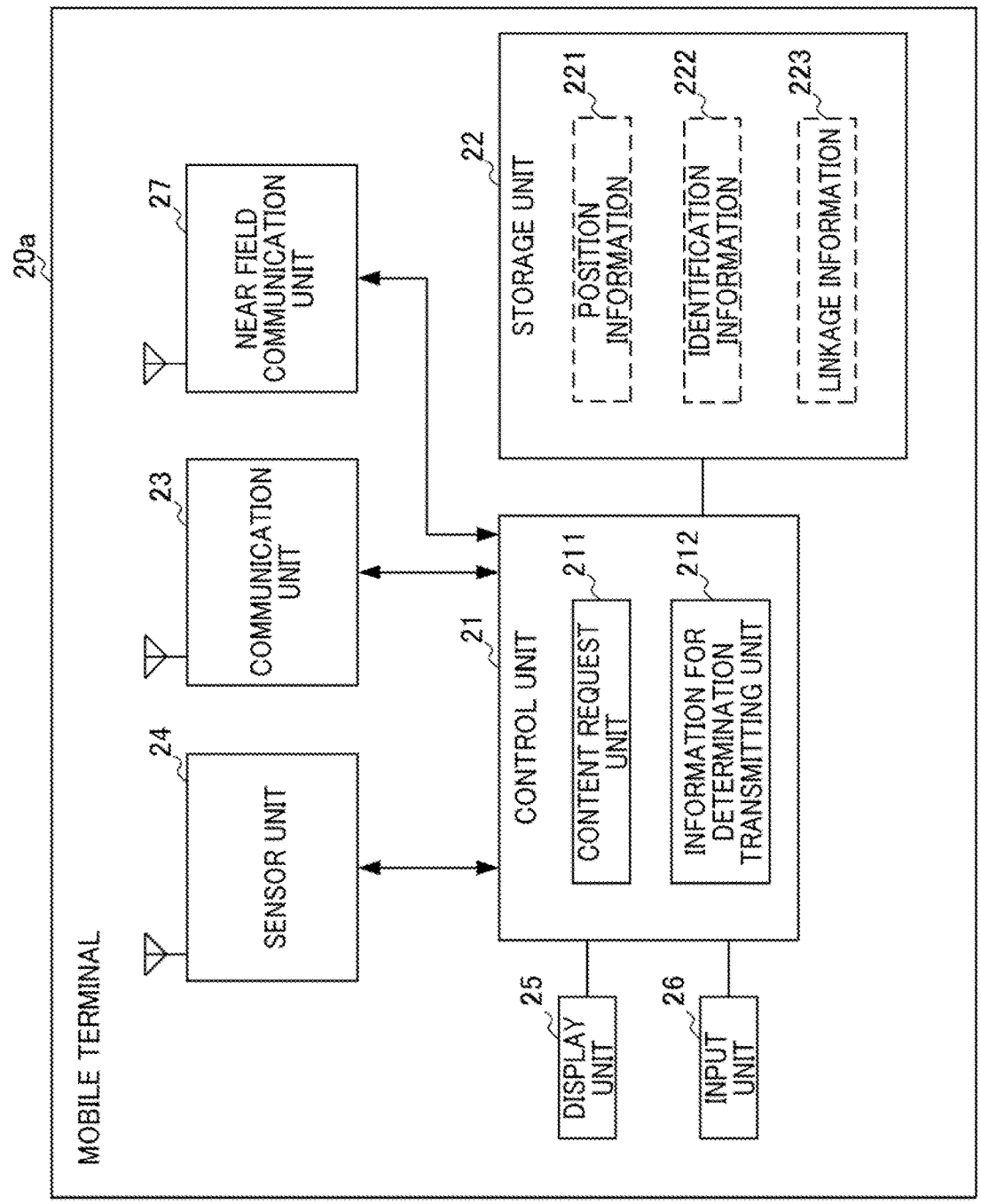
FIG. 10 is a functional block diagram illustrating a functional configuration of a mobile terminal in the third embodiment of the present invention.

<Mobile Terminal 20 of this Embodiment>
Next, the configuration of a mobile terminal 20a in this embodiment will be described with reference to a block of FIG. 10. The mobile terminal 20a in this embodiment is different from the mobile terminal 20 in the first embodiment described with reference to FIG. 3, in that an information for determination transmitting unit 212 is added, and the storage unit 32 stores linkage information 223.

The linkage information 223 is information indicating whether or not the mobile terminal 20a is linked to the vehicle 60 or the in-vehicle navigation device 10. Even though it has been described above as the description of the near field communication unit 27, the near field communication unit 27 performs the non-contact near field communication based on a standard such as the NFC or Bluetooth (registered trademark), or the wired near field communication through the USB cable or the like, with respect to the in-vehicle navigation device 10 or the vehicle 60. A state in which such near field communication can be performed is regarded as a state in which the mobile terminal 20a is linked to the vehicle 60 or the in-vehicle navigation device 10. For example, a state in which the mobile terminal 20a is paired with the vehicle 60 or the in-vehicle navigation device 10 in Bluetooth (registered trademark) is regarded as a state of being linked. The near field communication unit 27 in this embodiment stores the linkage information 223 indicating whether or not the mobile terminal 20a and the vehicle 60 or the in-vehicle navigation device 10 are in the state of being linked, in the storage unit 22.

When the content request unit 211 transmits the content distribution request with respect to the content distribution server 30, the information for determination transmitting unit 212 generates the information for determination on the basis of the linkage information 223, and transmits the information for determination with respect to the content distribution server 30. Furthermore, the information for determination includes information indicating whether or not the mobile terminal 20a is linked to the vehicle 60 or the in-vehicle navigation device 10, and the identification information 222.

Then, information indicating that the mobile terminal 20a is linked to the vehicle 60 or the in-vehicle navigation device 10 is information indicating that the vehicle 60, and the in-vehicle navigation device 10 that is activated by being engaged with the vehicle 60 are activated. That is, in this embodiment, the information indicating the linkage can be used as the activation information of the vehicle 60.

Operation of this Embodiment

In such a configuration, in a case where the content distribution request is received from the mobile terminal 20, the content distribution unit 312 in this embodiment also receives the information for determination from the mobile terminal 20. For this reason, it is not necessary to inquire for the information for determination with respect to the in-vehicle navigation device 10 corresponding to the mobile terminal 20 of the distribution request source. That is, it is possible to omit Step S12 of FIG. 8.

After that, the processing subsequent to Step S13, and the processing of Step S11 are common to the first embodiment and this embodiment, and thus, the repeated description will be omitted.

As described above, in this embodiment, it is possible to distribute contents according to a movement means as described with reference to FIG. 6 or FIG. 7, after more accurately determining the movement means on the basis of the information for determination. In addition, in this embodiment, it is possible to acquire the information for determination from the mobile terminal 20. For this reason, for example, even in a case where the vehicle 60 or the in-vehicle navigation device 10 does not have a function of performing communication with respect to the content distribution server 30, it is possible to realize this embodiment.

<Hardware and Software>

Furthermore, each device included in the navigation system described above can be realized by hardware, software, or a combination thereof. In addition, a navigation method performed by a cooperation between the devices included in the navigation system described above can be realized by hardware, software, or a combination thereof. Here, the navigation method being realized by software indicates that a computer reads and executes a program, and thus, the navigation method is realized.

The program can be stored by using various types of non-transitory computer readable media, and can be supplied to the computer. The non-transitory computer readable medium includes various types of tangible storage media. Examples of the non-transitory computer readable medium include a magnetic storage medium (for example, a flexible disk, a magnetic tape, and a hard disk drive), a magnetooptical storage medium (for example, a magnetooptical disk), a CD-read only memory (ROM), a CD-R, a CD-R/W, and a semiconductor memory (for example, a mask ROM, a programmable ROM (PROM), an erasable PROM (EPROM), a flash ROM, and a random access memory (RAM)). In addition, the program may be supplied to the computer by various types of transitory computer readable media. Examples of the transitory computer readable medium include an electric signal, an optical signal, and an electromagnetic wave. The transitory computer readable medium is capable of supplying the program to the computer through wired communication path such as an electric wire and an optical fiber, or a wireless communication path.

Modification Example

The embodiments described above are a preferred embodiment of the present invention, but the scope of the present invention is not limited only to the embodiments described above, and various modifications can be performed within a range not departing from the gist of the present invention.

First Modification Example

In each of the embodiments described above, as described as Step S14 of FIG. 8, the contents to be distributed are selected from the viewpoint of whether the user 50 is capable of visiting to the facility by the vehicle 60. In addition, the contents may be selected in consideration of other conditions. For example, contents associated with the route guidance in the in-vehicle navigation device 10 may be distributed. In this case, the information for determination that is transmitted from the in-vehicle navigation device 10 includes information indicating a facility that is set as a current destination in the route guidance of the route guiding unit 111, and information indicating a route to the facility.

Then, in Step S15, contents corresponding to any one or both of the information indicating the destination and the information indicating the route to the destination may be distributed. For example, contents corresponding to a facility of the destination are distributed, or contents corresponding to a facility on the route to the destination are distributed. Accordingly, it is possible to distribute contents that are more desirable for the user 50. In addition, for example, the contents may be selected in consideration of other conditions such as the attribute of each of the users 50, and a time zone at which the distribution is performed.

Second Modification Example

In each of the embodiments described above, it has been described that the in-vehicle navigation device 10 performs the route guidance, and for example, the mobile terminal 20 may have a function of performing the route guidance. In this case, as with the first modification example described above, contents associated with the route guidance may be distributed.

In this case, for example, the content distribution request that is transmitted from the mobile terminal 20 includes information indicating a facility that is set as a current destination in the route guidance of the mobile terminal 20, and information indicating a route to the facility. Then, in Step S15, contents corresponding to any one or both of the information indicating the destination and the information indicating the route to the destination may be distributed. Accordingly, as with the first modification example described above, it is possible to distribute contents that are more desirable for the user 50.

Third Modification Example

In each of the embodiments described above, the contents are distributed with respect to the mobile terminal 20. As a modification thereof, the contents may be distributed with respect to the in-vehicle navigation device 10. Accordingly, the user 50 is capable of referring to the contents that are subjected to the distribution request in the mobile terminal 20, in the display unit 15 of the in-vehicle navigation device 10, or the like.

Fourth Modification Example

In each of the embodiments described above, it has been assumed that the in-vehicle navigation device 10 is a device performing the route guidance processing. However, but the in-vehicle navigation device 10 is not limited thereto, and the in-vehicle navigation device 10 may be a device performing other processing. That is, the route guiding unit 111 or the map information 121 may be omitted from the in-vehicle navigation device 10.

Fifth Modification Example

The functional configuration of each of the embodiments described above may be modified. That is, the functional configuration of FIG. 2, FIG. 3, FIG. 4, FIG. 9, and FIG. 10 is merely an example, and the functional configuration of this embodiment is not limited thereto. That is, it is sufficient that each device has a function capable of executing a set of processing relevant to an information analysis function of the present invention as a whole, and using which functional block to realize the function is not particularly limited to the examples of FIG. 2, FIG. 3, FIG. 4, FIG. 9, and FIG. 10.

In addition, the description of the device for realizing such a functional configuration in the embodiments described above is also merely an example. For example, in the embodiments described above, it has been described that the content distribution server 30 is realized by one server device or the like, but a dispersion processing system may be used in which the functions of the content distribution server 30 are suitably dispersed to a plurality of server devices, respectively. In addition, a virtual server function or the like is used on a cloud, and thus, each of the functions of the content distribution server 30 may be realized.

In particular, for example, in the third embodiment, a server having the function of the information for determination accumulation unit 313, and a function of storing the information for determination 323 to be accumulated may be separately provided, and the content distribution server 30 may inquire for the information for determination with respect to the separate server. Such a configuration is particularly preferable in a case where the separate server collects and uses the information for determination for a purpose other than the content distribution.

EXPLANATION OF REFERENCE NUMERALS

1 CONTENT DISTRIBUTION SYSTEM
10 IN-VEHICLE NAVIGATION DEVICE
11, 21, 31 CONTROL UNIT
111 ROUTE GUIDING UNIT
112, 212 INFORMATION FOR DETERMINATION TRANSMITTING UNIT
12, 22, 32 STORAGE UNIT
121 MAP INFORMATION
122, 221 POSITION INFORMATION
123, 222 IDENTIFICATION INFORMATION
13, 23, 33 COMMUNICATION UNIT
14, 24 SENSOR UNIT
15, 25, 34 DISPLAY UNIT
16, 26, 35 INPUT UNIT
20, 20a MOBILE TERMINAL
211 CONTENT REQUEST UNIT
223 LINKAGE INFORMATION
27 NEAR FIELD COMMUNICATION UNIT
30, 30a CONTENT DISTRIBUTION SERVER
311 INFORMATION FOR DETERMINATION ACQUISITION UNIT
312 CONTENT DISTRIBUTION UNIT
313 INFORMATION FOR DETERMINATION ACCUMULATION UNIT
321 CUSTOMER MANAGEMENT DATABASE
322 CONTENT GROUP
323 ACCUMULATED INFORMATION FOR DETERMINATION
40 COMMUNICATION NETWORK
50 USER
60 VEHICLE

The invention claimed is:

1. A content distribution server, comprising:
a storage unit that stores map information of a facility selected by a user and a plurality of contents that are information associated with the facility;
an acquisition unit that acquires any one or both of activation information of a vehicle indicating an ignition switch state of the vehicle and position information of the vehicle from an in-vehicle device of the vehicle, as information for determination, the in-vehicle device being a navigation device including a microprocessor, a memory, a sensor, and a digital signal processor disposed on the vehicle; and
a content distribution unit that distributes the contents stored in the storage unit with respect to a mobile terminal, the mobile terminal being a portable electronic device configured for a case where the mobile terminal exists in the vehicle when the user is in the vehicle and a case where the user uses the mobile terminal and moves by movement means other than the vehicle, and configured for wireless communication with at least one of the vehicle and the in-vehicle device, wherein the content distribution unit determines that the user is capable of visiting to the facility by the vehicle in a case in which the information for determination that is acquired by the acquisition unit indicates that the vehicle has been activated, and determines that the user is incapable of visiting to the facility by the vehicle in a case in which the information for determination that is acquired by the acquisition unit does not indicate that the vehicle has been activated, and the content distribution unit determines which content in the plurality of contents stored in the storage unit is distributed with respect to the mobile terminal, on the basis of determination results relating to the activation of the vehicle, and wherein the information for determination includes information showing whether or not the vehicle is activated, as monitored by the in-vehicle device of the vehicle associated with the mobile terminal.

2. The content distribution server according to claim 1, wherein in a case where a distribution request of the content is received from the mobile terminal, the acquisition unit further requests the information for determination of the vehicle with respect to an in-vehicle device of a vehicle corresponding to a mobile terminal of a distribution request source of the content, and acquires the information for determination of the vehicle from the in-vehicle device, as a response of the request.

3. The content distribution server according to claim 1, further comprising:
an accumulation unit that receives the information for determination of the vehicle from the in-vehicle device of the vehicle, and accumulates the information for determination, triggered by activation of the vehicle,
wherein in a case where a distribution request of the content is received from the mobile terminal, the acquisition unit further acquires information for determination of a vehicle corresponding to a mobile terminal of a distribution request source of the content, from the accumulation unit.

4. The content distribution server according claim 2, further comprising:
a customer management database in which identification information of the mobile terminal and identification information of the vehicle are associated with each other, for each user,
wherein the acquisition unit further acquires the identification information of the mobile terminal from the mobile terminal of the distribution request source of the content, and specifies the vehicle corresponding to the mobile terminal of the distribution request source of the content, with reference to the acquired identification information of the mobile terminal, and the database.

5. The content distribution server according to claim 2, wherein the acquisition unit further acquires position information of the mobile terminal from the mobile terminal of the distribution request source of the content, and in a case where a position of the mobile terminal that is specified by the position information of the mobile terminal is in a predetermined range from a position of the vehicle that is specified by the information for determination, specifies the vehicle as the vehicle corresponding to the mobile terminal of the distribution request source of the content.

6. A content distribution server, comprising:
a storage unit that stores map information of a facility selected by a user and a plurality of contents that are information associated with the facility;
an acquisition unit that acquires linkage information indicating whether or not a mobile terminal and an in-vehicle device of a vehicle are in a state of being linked, from the mobile terminal, as information for determination, the in-vehicle device being a navigation device including a microprocessor, a memory, a sensor, and a digital signal processor disposed on the vehicle; and
a content distribution unit that distributes the contents stored in the storage unit with respect to the mobile terminal, the mobile terminal being a portable electronic device configured for a case where the mobile terminal exists in the vehicle when the user is in the vehicle and a case where the user uses the mobile terminal and moves by movement means other than the vehicle, and configured for wireless communication with at least one of the vehicle and the in-vehicle device,
wherein the content distribution unit determines that a user is capable of visiting to the facility by the vehicle in a case in which the information for determination that is acquired by the acquisition unit indicates an ignition switch state of the vehicle corresponding with the vehicle having been activated, and determines that the user is incapable of visiting to the facility by the vehicle in a case in which the information for determination that is acquired by the acquisition unit does not indicate the ignition switch state of the vehicle corresponding with the vehicle having been activated, and the content distribution unit determines which content in the plurality of contents stored in the storage unit is distributed with respect to the mobile terminal, on the basis of determination results relating to the activation of the vehicle, and
wherein the information for determination includes information showing whether or not the vehicle is activated, as monitored by the in-vehicle device of the vehicle associated with the mobile terminal.

7. The content distribution server according to claim 6, wherein the linkage information is information indicating whether or not near field communication is performed between the mobile terminal and the in-vehicle device.

8. The content distribution server according to claim 1, wherein in a case where it is determined that the user is capable of visiting to the facility by the vehicle, the content distribution unit further distributes a content that is stored in the storage unit and is associated with a facility provided with a parking lot, with respect to the mobile terminal.

9. The content distribution server according to claim 1, wherein in a case where a destination in route guidance is set in the in-vehicle device of the vehicle, the acquisition unit further acquires any one or both of information indicating the destination and information indicating a route to the destination, from the in-vehicle device, and
the content distribution unit distributes a content that is stored in the storage unit and corresponds to any one or both of the information indicating the destination and the information indicating the route to the destination, with respect to the mobile terminal.

* * * * *